United States Patent [19]

Martin

[11] Patent Number: 4,771,857

[45] Date of Patent: Sep. 20, 1988

[54] SEISMIC VIBRATOR SUPPORT ASSEMBLY

[75] Inventor: Dallas J. Martin, Friendswood, Tex.

[73] Assignee: Western Atlas International, Inc., Houston, Tex.

[21] Appl. No.: 816,391

[22] Filed: Jan. 6, 1986

[51] Int. Cl.⁴ .............................................. G01V 1/04
[52] U.S. Cl. ................................... 181/113; 181/121; 367/189; 73/663
[58] Field of Search .............. 181/113, 114, 119, 121; 367/142, 143, 173, 176, 189, 190; 73/665, 663, 666; 248/559, 567, 582, 596, 638; 267/136

[56] References Cited

U.S. PATENT DOCUMENTS

| | | | |
|---|---|---|---|
| 3,306,391 | 2/1967 | Bays | 181/121 |
| 3,690,402 | 9/1972 | Stafford | 181/114 |
| 3,884,324 | 5/1975 | Hamilton et al. | 181/121 |
| 4,056,164 | 11/1977 | Johnston | 181/119 X |
| 4,116,300 | 9/1978 | Stone | 181/114 |
| 4,253,538 | 3/1981 | Weber et al. | 181/121 X |
| 4,316,521 | 2/1982 | Chelminstri | 181/114 |
| 4,446,742 | 5/1984 | Thompson, Jr. et al. | 181/121 |
| 4,630,247 | 12/1986 | Rozyki | 367/189 |
| 4,635,747 | 1/1987 | Bird, Sr. et al. | 367/189 X |

FOREIGN PATENT DOCUMENTS 0915036  3/1982  U.S.S.R. ............................. 181/114

OTHER PUBLICATIONS

The Random House College Dictionary, 1980, Random House Inc., USA, p. 152.

Primary Examiner—Brian S. Steinberger
Attorney, Agent, or Firm—Barry C. Kane

[57] ABSTRACT

A stilt structure for a vibrator assembly in which the spider members on each end of the actuator are pivotally coupled to the vertical supports (stilts). The pivotal connection allows rotation of each component thereby eliminating induced bending moments between the spider members and the vertical supports.

7 Claims, 2 Drawing Sheets

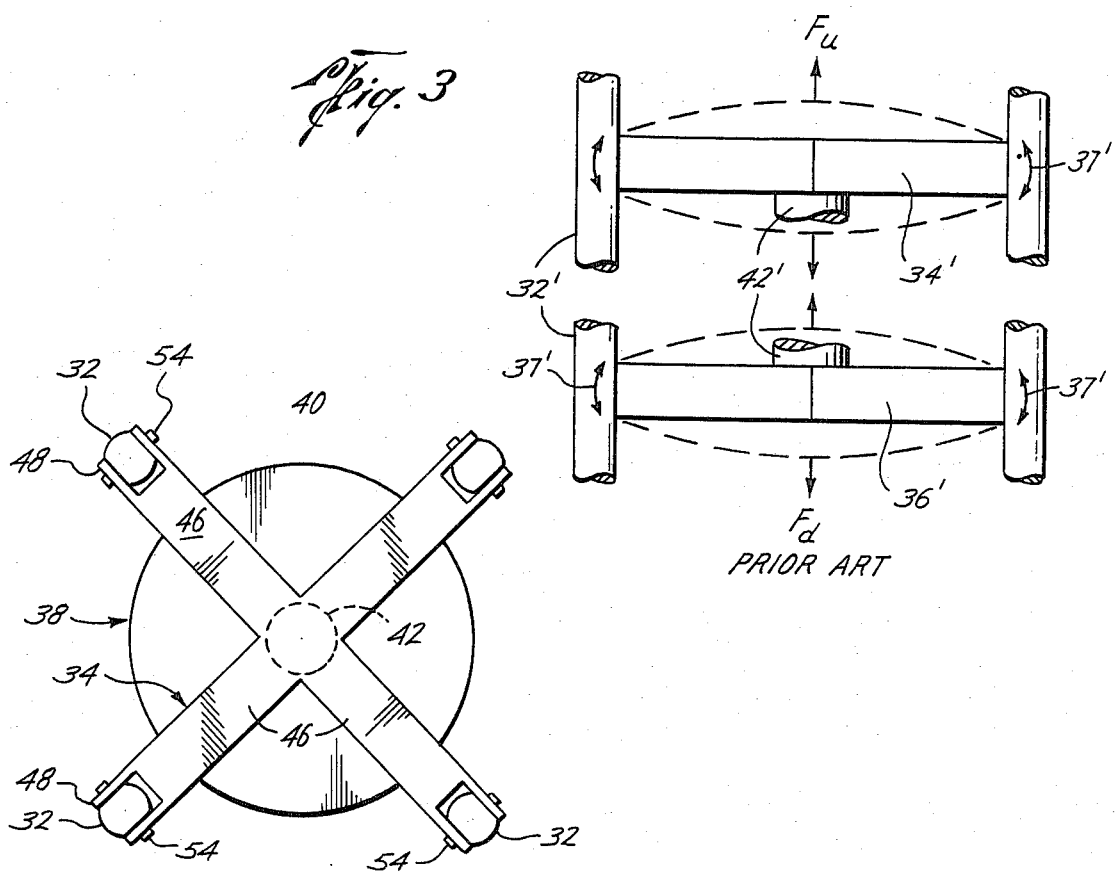
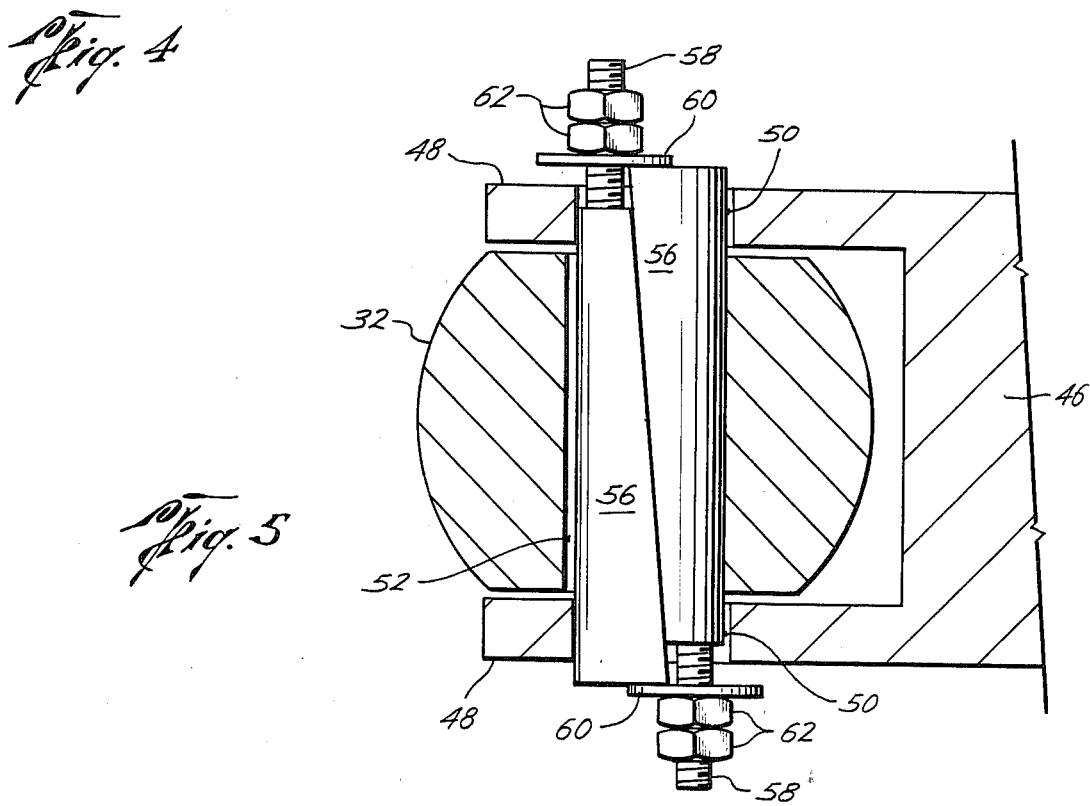

SEISMIC VIBRATOR SUPPORT ASSEMBLY

FIELD OF THE INVENTION

This invention relates to seismic sources and more particularly to vibrator support assemblies.

BACKGROUND OF THE INVENTION

Vibrators and widely used in seismic exploration. Typically, a vehicle such as a truck supports a large, heavy, substantially horizontal base plate that is connected by vertical columns or stilt structure to an inertia mass. The inertia mass contains a linear actuator that causes the base plate to move in reciprocating motion along a vertical or horizontal axis in reaction to the momentum of the inertia mass. The reciprocating base plate injects a vibratory wave train into the earth that may last more than 20 seconds. The frequency of the vibratory wave may vary continuously from 5 to more than 80 Hertz creating a sweep signal. During the sweep cycle a portion of the vehicle's weight is applied to the base plate through compliant isolation members such as airbags or springs. The weight of the vehicle increases the coupling of the base plate with the earth while the isolation members reduce the amount of vibratory energy transferred to the vehicle.

In operation, the vibrator assembly, and the stilt structure in particular, is subject to extreme tensional and compressional forces caused by the reciprocating inertia mass. In order to combat structural fatigue in the stilt structure, all components are structurally stiff and rigidly fastened to each other either by way of bolts or welds. Despite many oversized components and rigid connections structural failures are commonplace particularly in connections between horizontal and vertical components experiencing dynamic bending moments or stress.

SUMMARY OF THE INVENTION

It is an object of this invention to provide a stilt structure in which the stress is substantially reduced between coupled components decreasing the possibility of structural failure.

The instant invention is an improved stilt structure for a seismic vibrator in which horizontal supports on each end of a linear actuator are pivotally connected to vertical supports connected to a base plate. In accordance with an aspect of this invention the horizontal supports are pivotally coupled to the vertical supports substantially reducing structural bending moments present therein during operation and increasing the durability thereof. In accordance with another aspect of this invention, an expansion-type connector is used to couple the horizontal and vertical supports allowing pivotal motion therebetween yet preventing lateral movement.

DESCRIPTION OF THE FIGURES

FIG. 3 is a schematic diagram illustrating forces induced in conventional stilt structures.

FIG. 4 is a plan view of the vibrator spiders and support columns; and

FIG. 5 illustrates in cross section the connection of a spider leg to a column.

DETAILED DESCRIPTION OF THE PREFERRED EMBODIMENT

Figure 1:
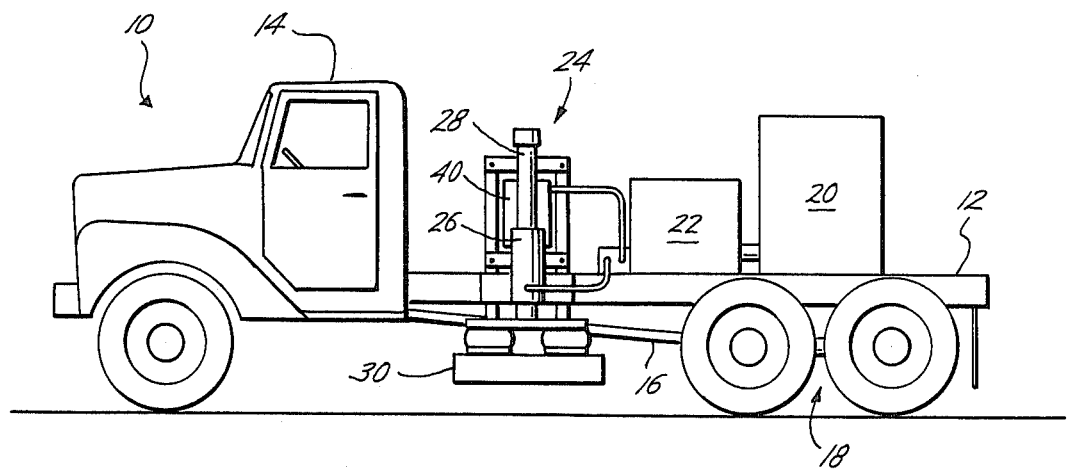
FIG. 1 is a side elevational view of a truck mounted vibrator.

FIGS. 1-5 are illustrative of the preferred embodiment of this invention wherein like reference numerals indicate like components.

In FIG. 1 a truck 10 is shown in a side elevational view. The truck 10 includes a chassis 12 having a forward mounted cab 14 enclosing an engine and transmission (not shown). A drive shaft 16 leads from the transmission to a rear drive assembly, generally shown as 18, mounted to the rear of chassis 12. Also mounted to chassis 12 are a prime mover 20, such as a diesel engine, that drives a hydraulic pump 22 which in turn powers a seismic vibrator assembly 24. Vibrator assembly 24 is raised and lowered with respect to the truck 10 by hydraulic jacks 26 and columns 28.

Figure 2:
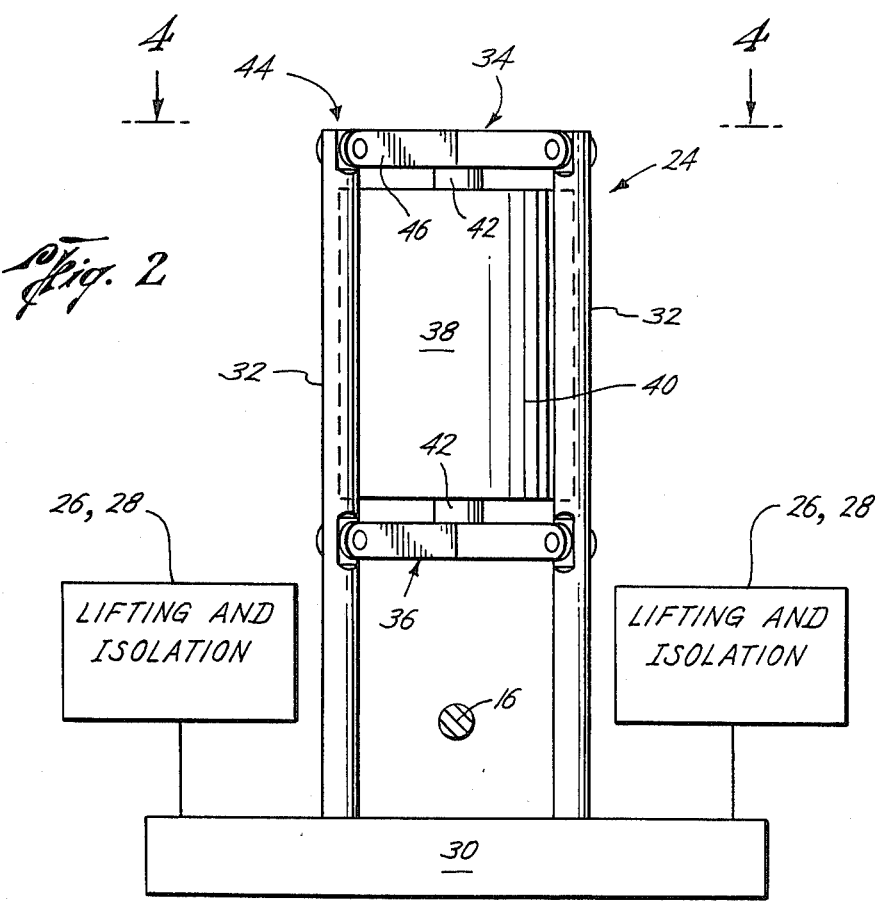
FIG. 2 is a front elevational view of a typical vibrator assembly.

FIG. 2 is a front-elevational view of a portion of the vibrator assembly 24. The lift mechanism and isolation systems have not been shown but are well known in the art. In the Figure, the vibrator assembly 24, as shown, includes a base plate 30 having a plurality of vertically-oriented rods 32, each having one end symmetrically connected thereto. The upper portions of the rods 32 are interconnected by upper and lower horizontal cross members 34 and 36, respectively. Centrally disposed between cross members 34 and 36 is a linear actuator 38 consisting of a reaction mass 40 having a double-ended piston rod 42 extending therethrough. Each end of piston rod 42 is centrally connected to one of the cross members 34 and 36. The frame-like structure consisting of the rods 32 interconnected by cross members 34 and 36, is called a stilt structure generally indicated as 44. The stilt structure 44 transfers the energy generated by the linear actuator 34 to the base plate 30, which in turn injects it into the earth.

FIG. 3 is a diagram illustrating conventional upper and lower cross members 34' and 36' interconnected by rods 32'. A portion of each piston rod 42' is also shown. In conventional construction, cross members 34' and 36' are rigidly fastened to rods 32' either by way of using a plurality of bolts at each connection or by welding. During operation of the vibrator, the reciprocating motion of the linear actuator generates upward and downward forces F, causing the upper and lower cross members, 34' and 36', to flex which in turn try to flex rods 32' shown by arrows 37'. This cyclic flexure resulting from bending moments often results in structural failure at the connections of the stilt structure.

Refer to FIGS. 4 and 5 where a single cross member, such as 34, is shown pivotally coupled to rods 32. Each leg 46 of cross member 34 is terminated in a pair of flanges 48 that receive a rod 32. Holes 50 extending through the middle of each flange 48 and a hole 52 transversely extending through rod 32 receive an expansion bolt 54 therethrough. Bolt 54 consists of a pair of semi-cylindrical wedges 56. The narrow ends of each wedge 56 are terminated in threads 58 that receive washers 60 and nuts 62.

In operation, expansion bolts 54 are used to connect cross members 34 and 36 to rods 32. The nuts 62 are tightened forcing the wedges 56 to slide past each other and expand. The expansion of the wedges 56 in turn aligns the holes and compensate for any machining misalignments between the two components. The expansion bolts 56 prevent any vertical or lateral translation between the legs 46 and rods 32 yet allow rotation therebetween about the axis of the expansion bolt 54 and perpendicular to the plane of the cross members 34 and 36.

During operation of the vibrator 24, the flexure of the upper and lower cross members 34 and 36 due to the reciprocation of the reaction mass 40 is not transferred to rods 32. The flexure is not transferred because of the pivotal coupling of the spiders 34 and 36 to the rods 32, thus eliminating structure fatigue due to cyclic bending moments.

For illustrative purposes, my invention has been described with a certain degree of specificity. Variations will occur to those skilled in the art but which may be included within the scope and spirit of this invention which is limited only by the appended claims.

I claim as my invention:

1. In an improved stilt structure for a seismic vibrator including a reaction mass, a double-ended piston rod having a centrally located piston extending therethrough, a first and a second cross member, each centrally coupled to one end of said piston rod in a plane perpendicular to the axis of said piston rod, a plurality of vertical members interconnecting said first and second cross members, and a base plate connected to one end of said vertical members, the improvement comprising:
    (a) expansion means for pivotally coupling each cross member to said plurality of vertical members so as to allow a predetermined partial rotation about a horizontal axis, substantially eliminating bending-movement-induced stress in each cross member and said plurality of vertical members whereby said expansion means aligns and prevents lateral and vertical movement between each cross member and each vertical member, and each cross member may rotate about a horizontal axis defined by said expansion means.

2. The stilt structure of claim 1, wherein said expansion means comprises a pair of wedges urged against each other to expand within a hole coupling each cross member and each vertical member.

3. A method for substantially reducing bending moment-induced stress in a vibrator stilt structure connecting a double-ended linear actuator to a base plate; said stilt structure including at least one cross member interconnecting one end of said linear actuator to a plurality of rods connected to said base plate, comprising the step of:
    (a) pivotally coupling said cross member to each of said rods with an expansion bolt so that flexure of said cross member during operation of said linear actuator is not transmitted to said rods whereby said expansion bolt aligns and prevents lateral and vertical movement between the cross member and each rod, and the cross member may rotate about a horizontal axis defined by said expansion bolt.

4. In a seismic vibrator of the type having a vertically reciprocating reaction mass coupled to a base plate by means of a plurality of vertical members interconnected with a plurality of horizontal members, the improvement comprising:
    (a) non-rigid connecting means attaching said horizontal members to said vertical members whereby transference of bending stress from said horizontal members to said vertical members is substantially eliminated, wherein said non-rigid connecting means, comprises an expansion bolt, whereby said horizontal members are allowed to rotate about each said expansion bolt when said horizontal members are vertically displaced by said reaction mass.

5. The vibrator of claim 2, wherein said expansion bolt comprises a pair of wedges urged against each other to expand within a hole coupling each horizontal member and each vertical member.

6. A vibrator assembly, comprising:
    (a) a linear actuator having a dual-ended piston rod extending therethrough;
    (b) a pair of cross members, each centrally coupled to one end of said piston rod in a plane perpendicular to an axis of said piston rod;
    (c) a plurality of vertical members disposed around said linear actuator and pivotally interconnecting the cross members to each other, whereby each cross member may flex without inducing bending moments in each of said vertical members; and
    (d) a ground contacting base plate coupled to one end of said plurality of vertical members, and further comprising expansion means coupling the cross members to each of said vertical members, whereby said expansion means aligns and prevents lateral and vertical movement between each cross member and each vertical member, and each cross member may rotate about a horizontal axis defined by said expansion means.

7. The vibrator assembly of claim 5, wherein said expansion means comprises a pair of wedges urged against each other to expand within a hole coupling each cross member and each vertical member.

* * * * *